Figure 1:
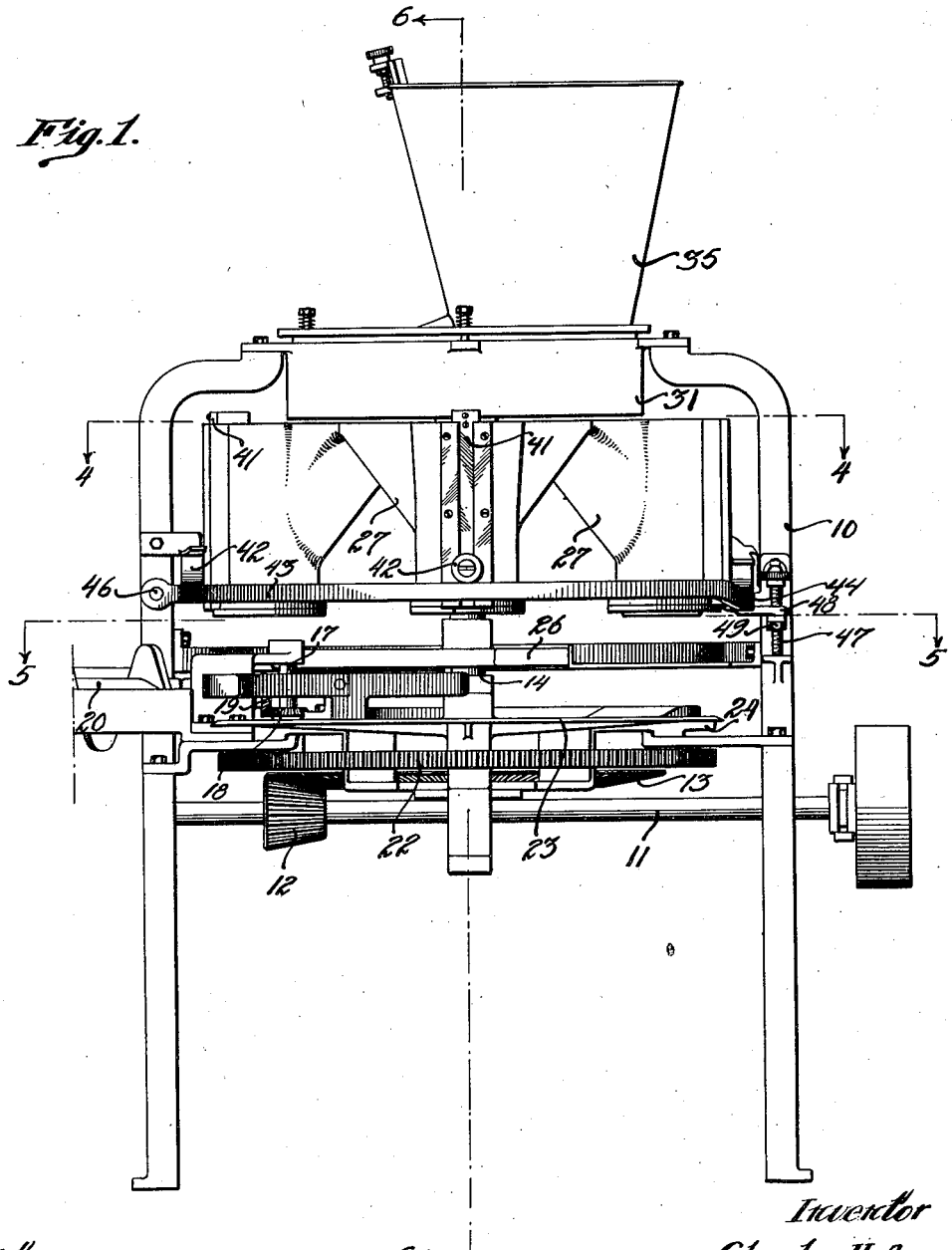

June 19, 1923.

C. H. AYARS

CAN FILLING MACHINE

Filed April 18, 1922

1,459,492

7 Sheets-Sheet 1

Witnesses
George A. Gruss
Elizabeth Garbe

Inventor
Charles H. Ayars
By Joshua R. H. Potts
his Attorney

June 19, 1923.

C. H. AYARS 1,459,492

CAN FILLING MACHINE

Filed April 18, 1922    7 Sheets-Sheet 3

Witnesses
George A. Gruss
Elizabeth Garbe

Inventor
Charles H. Ayars
By Joshua R.H. Potts
his Attorney

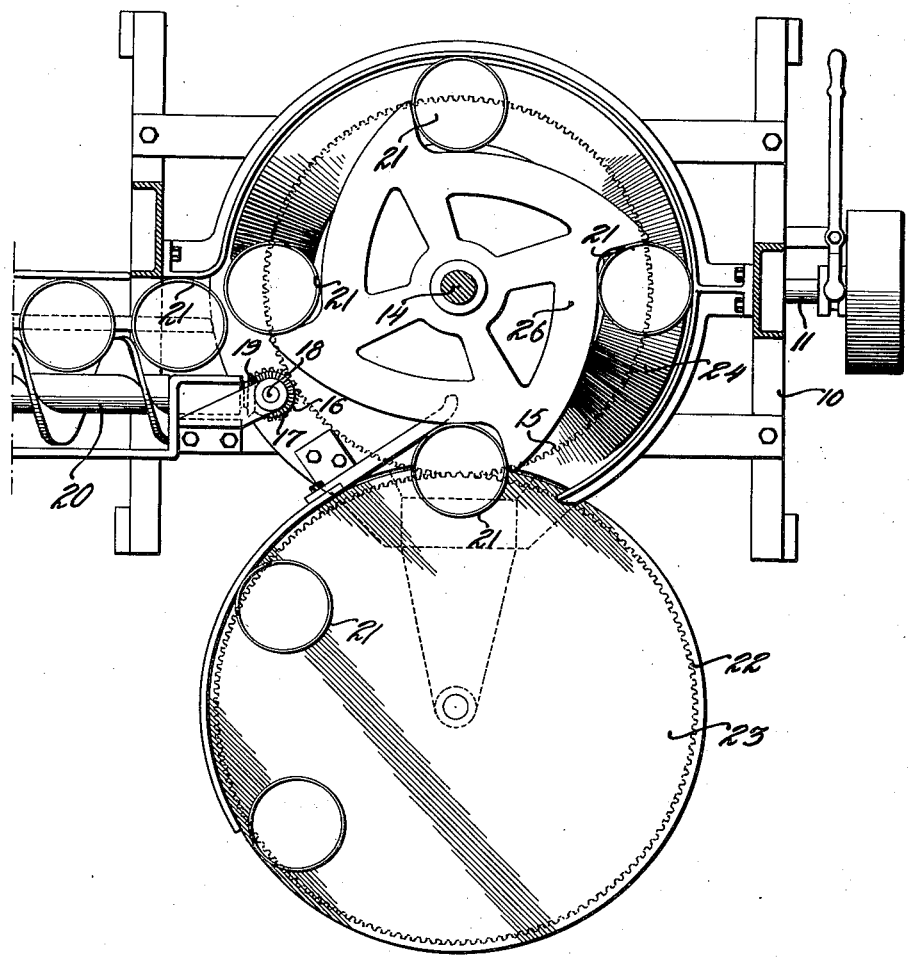

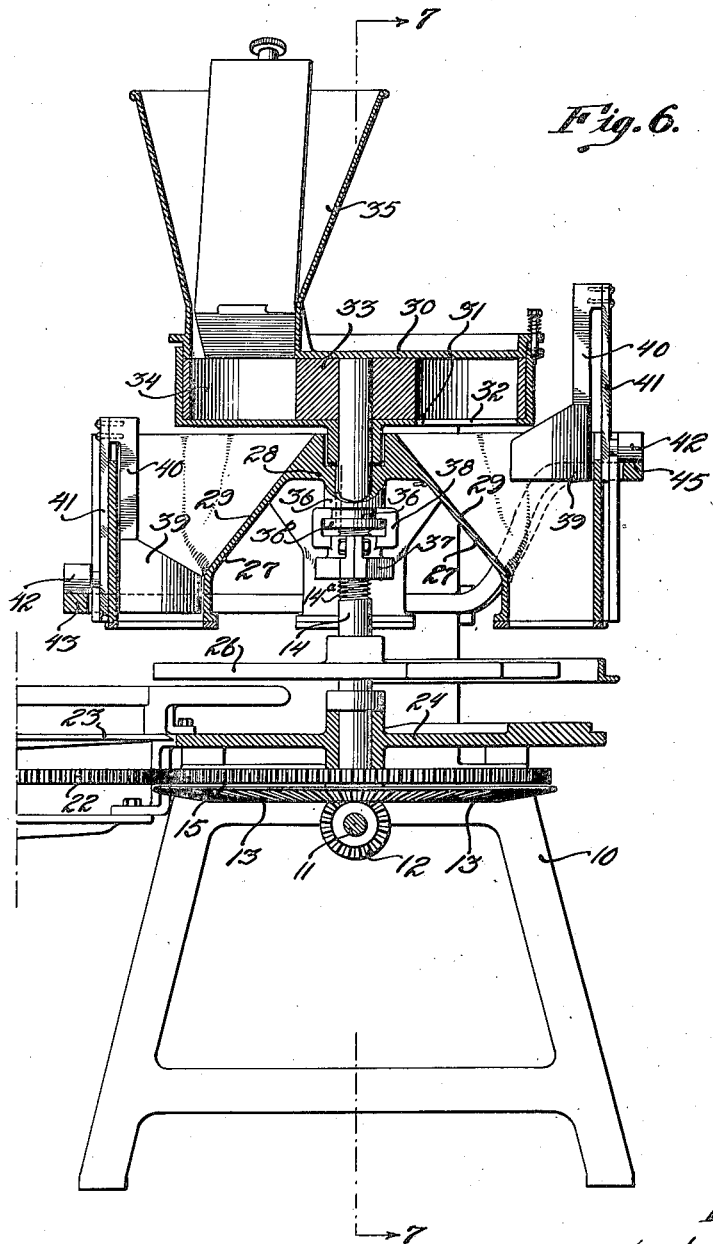

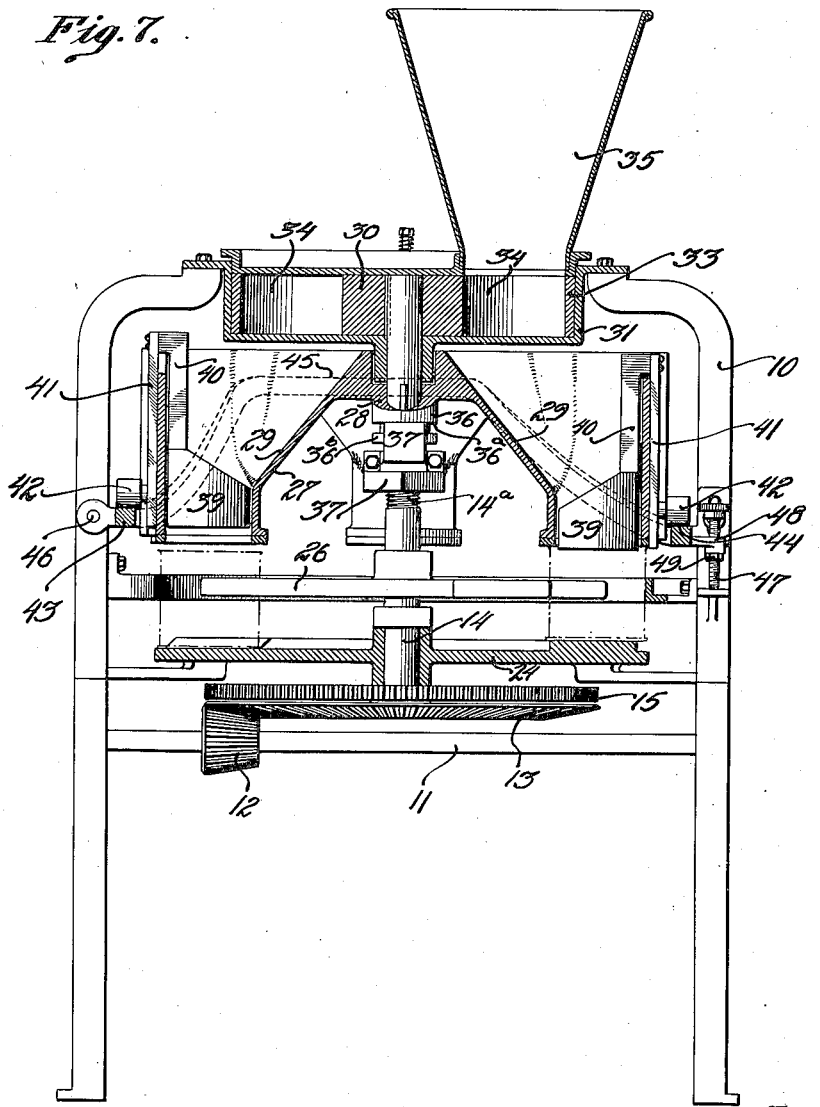

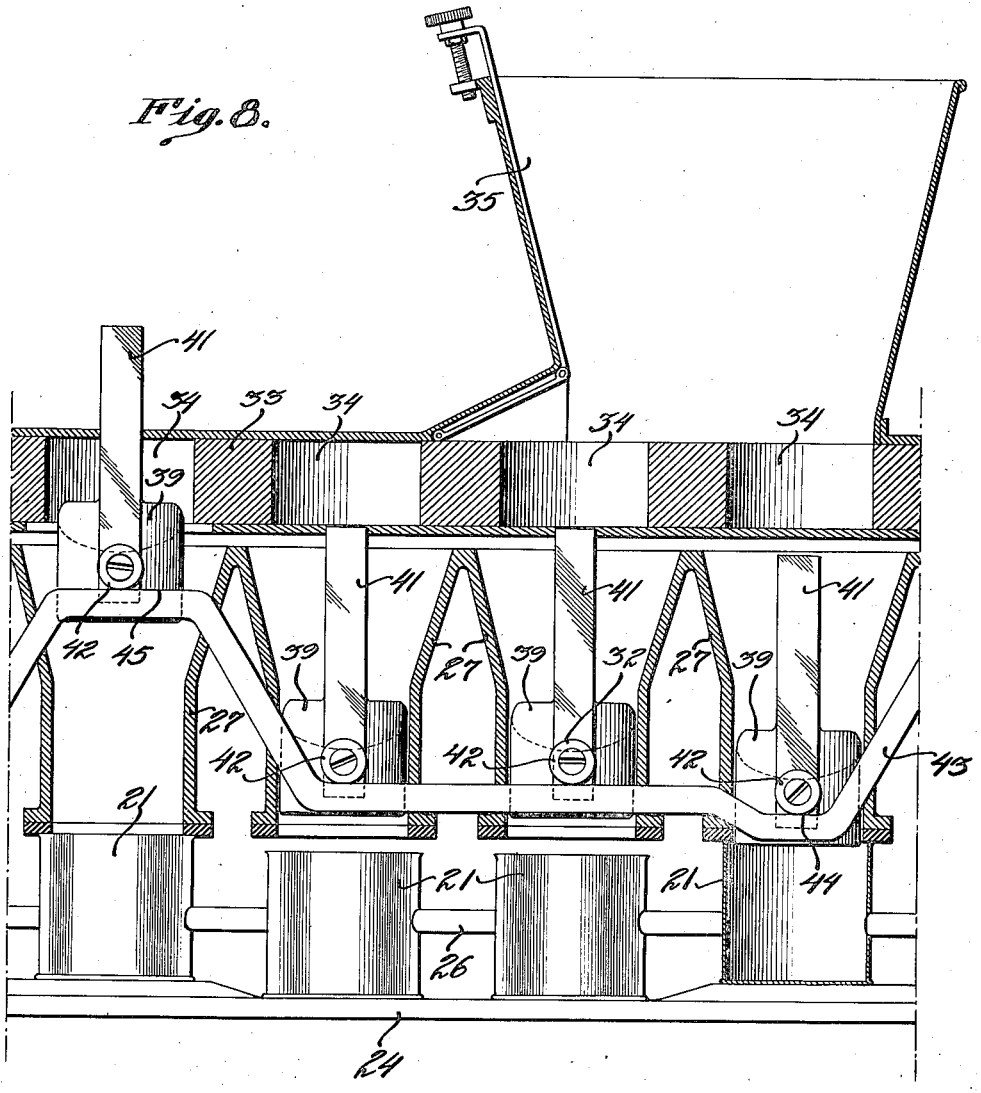

Patented June 19, 1923.

1,459,492

UNITED STATES PATENT OFFICE.

CHARLES H. AYARS, OF SALEM, NEW JERSEY, ASSIGNOR TO AYARS MACHINE COMPANY, OF SALEM, NEW JERSEY.

CAN-FILLING MACHINE.

Application filed April 18, 1922. Serial No. 554,995.

*To all whom it may concern:*

Be it known that I, CHARLES H. AYARS, a citizen of the United States, residing at Salem, in the county of Salem and State of New Jersey, have invented certain new and useful Improvements in Can-Filling Machines, of which the following is a specification.

The object of my invention is to provide simple and efficient mechanism for pressing fruits, or other substances, into the cans whereby the cans will be completely filled without crushing the fruit, and the invention consists in the parts and combination and arrangement of parts hereinafter described and claimed.

In the drawings:—

Figure 2:
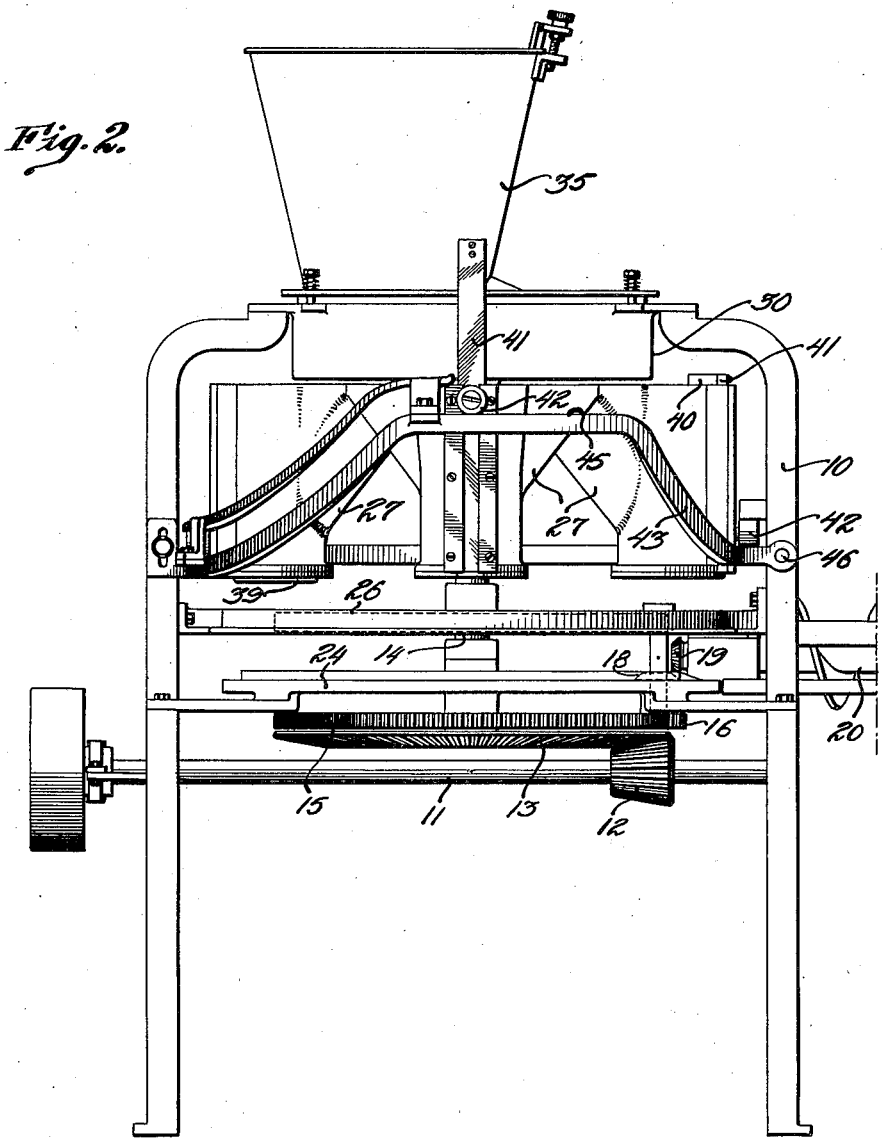
Figure 3:
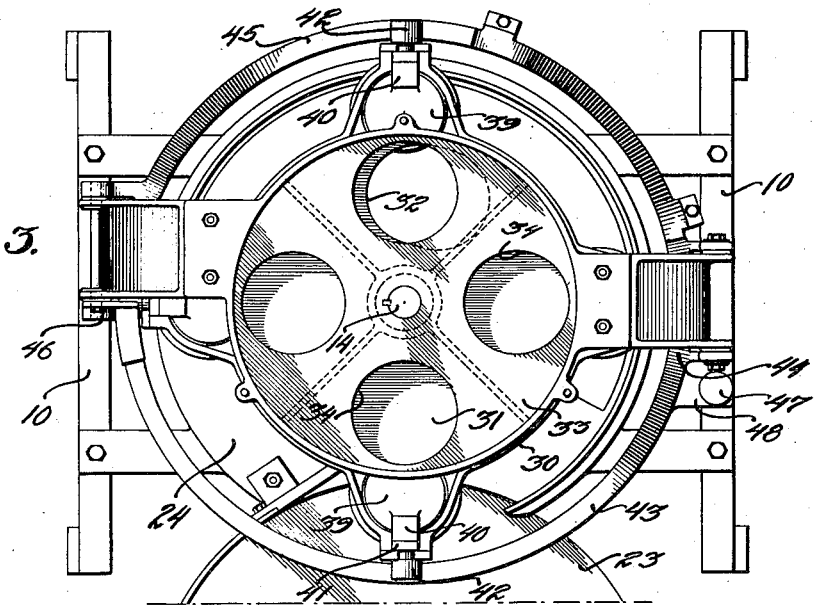
Figure 4:
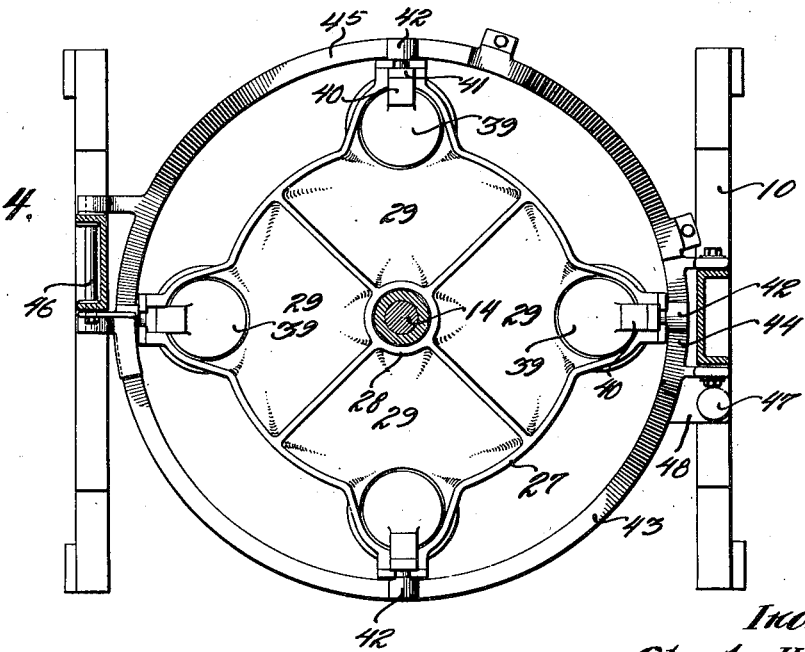

Figure 1 is a front elevation of a filling machine constructed in accordance with my invention, Figure 2 is a rear elevation of the same, Figure 3 is a top plan view of Figure 1, the hopper being removed to more clearly illustrate certain parts of my invention, Figure 4 is a section taken on the line 4—4 of Figure 1, certain parts of the machine being omitted for clearness of illustration, Figure 5 is a section taken on the line 5—5 of Figure 1, Figure 6 is a section taken on the line 6—6 of Figure 1, certain of the parts being omitted for clearness of illustration, Figure 7 is a section taken on the line 7—7 of Figure 6, and Figure 8 is a sectional developed view of the machine shown in Figure 1 illustrating the cycle of operation in a step by step movement.

In the drawings, 10 indicates the frame of the machine, 11 the driving shaft, 12 a bevel gear on the driving shaft meshing with a bevel gear 13 fixed to an upright shaft 14, 15 a gear fixed to the upright shaft and meshing with a gear 16 fixed to and adapted to actuate an upright shaft 17 which carries a bevel gear 18 meshing with a bevel gear 19 adapted to actuate a worm shaft 20 which feeds the empty cans 21 to the machine. The gear 15 also meshes with a gear 22 rotatably mounted on the frame and carrying a delivering disk 23, 24 represents a disk mounted upon the frame and upon which the empty cans are deposited as they come from the can feeding mechanism. Immediately above disk 24 there is a can-positioning wheel 26 which is keyed to and rotates with shaft 14, 27 represents the funnels through which the materials are fed from the measuring receptacles to the cans. These funnels are connected by a central hub 28 keyed to shaft 14 but capable of vertical movement thereon. The funnels have cylindrical throats, adapted to receive plungers, and depart from the usual funnel shape in having a part of their periphery vertical while the other part 29 inclines inwardly from the throat in such manner that by rotation of the hub, the inclined parts will be successively brought under the discharge opening 32 through which the materials are fed through the bed plate 31 of the turret 30. 33 represents the measuring wheel, 34 the measuring receptacles and 35 the hopper. The central hub 28 of the funnels is provided with a collar 36 which is embraced by U-shaped lugs 38 carried by a split nut 37 on a threaded part 14ª of shaft 14. By turning the nut upwardly or downwardly the position of the funnels may be vertically adjusted to enable them to function with different sizes of cans. A plunger 39 arranged to reciprocate vertically, is provided for each funnel 27. Each plunger has an upwardly extending arm 40 secured to a plate or bar 41 extending downwardly outside the funnel and carrying at its lower end a roller 42 adapted to travel on a camtrack 43. The low point of the cam-track is indicated at 44 and the high point at 45 as shown in Figure 8. In order that the cam-track may be adjusted vertically it is hinged to the frame at 46 and supported at its opposite side by a bolt 47 taking loosely through a lug 48 extending from the camtrack, a nut 49 being provided to support the lug.

In operation rotation of the central hub 28 of the funnels moves the rollers on the camtrack and they are carried alternately to the high and low points of the track thereby reciprocating the plungers in the funnels.

By constructing the funnels with the inclined surface and so positioning them that the tomatoes or other fruit to be canned will fall upon the incline and slide to the turret before the plunger engages with them crushing is avoided and the fruit is pressed into the cans by the positive action of the plungers induced by the rollers upon the camtrack.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a can filling machine, a bed plate having a discharge opening; a measuring wheel rotatable upon the bed plate; a shaft adapted to rotate the measuring wheel; a hub mounted on the shaft and carrying a series of funnels, each funnel having an inclined inner face, a vertical outer face and a vertically walled throat, and plungers arranged to reciprocate upon the vertical walls of the funnels and to take into the throats.

2. In can filling machine, a bed plate having a discharge opening; a measuring wheel rotatable upon the bed plate; a shaft adapted to rotate the measuring wheel; a hub mounted on the shaft and carrying a series of integral funnels, each funnel having an inclined inner face, a vertical outer face and a vertically walled throat, and plungers arranged to reciprocate upon the vertical walls of the funnels and to take into the throats.

3. In a can filling machine, a bed plate having a discharge opening; a measuring wheel rotatable upon the bed plate; a shaft adapted to rotate the measuring wheel; a hub splined to the shaft and carrying a series of funnels, each funnel having an inclined inner face, a vertical outer face and a vertically walled throat; plungers arranged to reciprocate upon the vertical walls of the funnels, and means for adusting the position of the hub on the shaft.

4. In a can filling machine, a bed plate having a discharge opening; a measuring wheel rotatable upon the bed plate; a shaft adapted to rotate the measuring wheel; a hub splined to the shaft and carrying a series of funnels, each funnel having an inclined inner face, a vertical outer face and a vertically walled throat; plungers arranged to reciprocate upon the vertical walls of the funnels; means for vertically adjusting the position of the plungers, and means for adjusting the position of the hub on the shaft.

5. In a can filling machine, a bed plate having a discharge opening; a measuring wheel rotatable upon the bed plate; a shaft adapted to rotate the measuring wheel; a hub mounted on the shaft and carrying a series of funnels, each funnel having an inclined inner face, a vertical outer face and a vertically walled throat; a cam track; a plunger for each funnel, each plunger having an upwardly extending arm secured to a plate extending downwardly outside the funnel; rollers carried by the plates adapted to travel on the cam plate and reciprocate the plungers, and means for vertically adjusting the cam track.

In testimony whereof I have signed my name to this specification in the presence of two subscribing witnesses.

CHARLES H. AYARS.

Witnesses:
GEORGE P. PARKINSON,
CHAS. E. POTTS.